US012743701B2

(12) United States Patent
Ilangovan et al.

(10) Patent No.: US 12,743,701 B2
(45) Date of Patent: Sep. 22, 2026

(54) SYSTEMS AND METHODS FOR PAYMENT AUTHORIZATION UTILIZING A UNIVERSAL TOKEN

(71) Applicant: VeriFone, Inc., Wilmington, DE (US)

(72) Inventors: Subadeepak Ilangovan, Herne Bay (GB); Kingshuk Nag, Munich (DE)

(73) Assignee: VeriFone, Inc., Wilmington, DE (US)

( * ) Notice: Subject to any disclaimer, the term of this patent is extended or adjusted under 35 U.S.C. 154(b) by 62 days.

(21) Appl. No.: 18/688,570

(22) PCT Filed: Aug. 24, 2022

(86) PCT No.: PCT/US2022/075408
§ 371 (c)(1),
(2) Date: Mar. 1, 2024

(87) PCT Pub. No.: WO2023/034708
PCT Pub. Date: Mar. 9, 2023

(65) Prior Publication Data

US 2024/0394699 A1 Nov. 28, 2024

Related U.S. Application Data

(60) Provisional application No. 63/260,900, filed on Sep. 3, 2021.

(51) Int. Cl.
*G06Q 20/40* (2012.01)
*G06Q 20/02* (2012.01)
(Continued)

(52) U.S. Cl.
CPC ......... *G06Q 20/403* (2013.01); *G06Q 20/027* (2013.01); *G06Q 20/202* (2013.01); *G06Q 20/40* (2013.01); *G06Q 40/02* (2013.01)

(58) Field of Classification Search
CPC .. G06Q 20/403; G06Q 20/027; G06Q 20/202; G06Q 20/40; G06Q 40/02
(Continued)

(56) References Cited

U.S. PATENT DOCUMENTS 6,324,524 B1 11/2001 Lent et al.
6,658,393 B1 12/2003 Basch et al.
(Continued)

FOREIGN PATENT DOCUMENTS

CA 2998274 A1 9/2018
CN 105282725 A 1/2016

OTHER PUBLICATIONS

"Payment Token Types: How Merchants Can Leverage Tokenization for Optimized Processing", dated Jul. 9, 2025 (Year: 2025).*
(Continued)

*Primary Examiner* — Hai Tran
(74) *Attorney, Agent, or Firm* — Bond, Schoeneck & King, PLLC

(57) ABSTRACT

A system for authenticating a payment transaction is provided, including a payment device (such as an ECR or payment terminal), a provider gateway, and a universal token vault. The payment device provides a payment processing request including a tokenization request and an account number (such as a PAN or DPAN). The provider gateway receives the payment processing request from the payment device. The provider gateway then provides the account number and the tokenization request to a payment network (such as a credit card service). The provider gateway then receives, via the payment network, a network token and a PAR. The universal token vault then receives, via the provider gateway, the network token and the PAR. The universal token then creates or updates a universal token
(Continued)

to associate the network token with the PAR. The universal token may then be provided to a merchant server for storage.

17 Claims, 11 Drawing Sheets

(51) Int. Cl.
*G06Q 20/20* (2012.01)
*G06Q 40/02* (2023.01)

(58) Field of Classification Search
USPC ........................................................ 705/44
See application file for complete search history.

(56) References Cited

U.S. PATENT DOCUMENTS

| | | | |
|---|---|---|---|
| 9,449,319 | B1 | 9/2016 | Agarwal et al. |
| 10,984,434 | B1 | 4/2021 | Arya et al. |
| 2004/0153396 | A1 | 8/2004 | Hinderer |
| 2005/0192896 | A1 | 9/2005 | Hutchison et al. |
| 2006/0212386 | A1 | 9/2006 | Willey et al. |
| 2008/0016003 | A1 | 1/2008 | Hutchison et al. |
| 2008/0052226 | A1 | 2/2008 | Agarwal et al. |
| 2010/0010930 | A1 | 1/2010 | Allen et al. |
| 2010/0057606 | A1 | 3/2010 | Louie et al. |
| 2013/0212007 | A1 | 8/2013 | Mattsson et al. |
| 2014/0040144 | A1 | 2/2014 | Plomske et al. |
| 2014/0040145 | A1 | 2/2014 | Ozvat et al. |
| 2015/0032625 | A1 | 1/2015 | Dill et al. |
| 2016/0148197 | A1 | 5/2016 | Dimmick |
| 2017/0061428 | A1* | 3/2017 | Prabhu ............... G06Q 20/3674 |
| 2017/0109745 | A1* | 4/2017 | Al-Bedaiwi ......... G06Q 20/401 |
| 2018/0068294 | A1 | 3/2018 | Melgar et al. |
| 2018/0336557 | A1 | 11/2018 | Khurana et al. |
| 2019/0333087 | A1 | 10/2019 | Appana |
| 2020/0065796 | A1 | 2/2020 | Jain et al. |
| 2020/0258061 | A1 | 8/2020 | Beadles et al. |
| 2020/0364720 | A1* | 11/2020 | Lally .................. G06Q 20/4037 |
| 2022/0200982 | A1* | 6/2022 | Krishnaiah ......... H04L 63/0815 |
| 2022/0398585 | A1 | 12/2022 | Anderson |

OTHER PUBLICATIONS

International Search Report and the Written Opinion of the International Searching Authority, PCT Application No. PCT/US2022/075408, pp. 1-6, dated Nov. 21, 2022.

International Search Report and the Written Opinion of the International Searching Authority, PCT Application No. PCT/US2022/071864, pp. 1-8, dated Jul. 1, 2022.

"EMVCo Payment Account Reference (PAR): A Primer," Version 1.1, Secure Technology Alliance, Apr. 30, 2018, pp. 1-20.

EMVCo, "EMV Payment Tokenisation Specification—Technical Framework," vol. 2, Feb. 7, 2017, pp. 1-118.

EP Search Report, EP Patent Application No. 22865665.8, dated Jun. 5, 2025, pp. 1-11.

EP Search Report, EP Patent Application No. 22865687.2, dated Apr. 11, 2025, pp. 1-15.

* cited by examiner

SYSTEMS AND METHODS FOR PAYMENT AUTHORIZATION UTILIZING A UNIVERSAL TOKEN

CROSS-REFERENCE TO RELATED APPLICATIONS

The present application is a United States National Stage Application pursuant to 35 U.S.C. § 371 of International Patent Application Serial No. PCT/US2022/075408, entitled "Systems and Methods for Payment Authorization Utilizing a Universal Token", filed on Aug. 24, 2022, which claims priority to U.S. Provisional Patent Application Ser. No. 63/260,900, entitled "Universal Token Solution", filed on Sep. 3, 2021, which applications are hereby incorporated by reference in their entireties.

FIELD OF THE DISCLOSURE

The present disclosure is directed generally to systems and methods for payment authorization and tokenization.

BACKGROUND

Due to continuously evolving payment ecosystems, retailers and payment processors face a number of challenges to integrate multiple payment types in a manner which improves customer retention, allows merchants to fine-tune their goods and/or services, increases loyalty across payment channels, and provides for cross-channel payment acceptance. Similarly, payment processors are expected to provide consumers with a single, integrated payment experience across a wide array of payment channels. For example, modern consumers are exposed to various payment methods, such as cards, devices, wearables, and subscription models. All of these payment methods are continuously evolving. Maintaining a relationship of various payment credentials of each consumer is challenging, as is providing a frictionless cross-channel payment experience. Accordingly, there is a need in the art to address the frictions introduced by the hybridization of payment solutions.

SUMMARY OF THE DISCLOSURE

The present disclosure is generally directed to systems and methods for generating and utilizing a universal token for payment authorization. The universal token eliminates the need for complex orchestration by merchants operating cross-channel payments that are contingent on varying operating models, leading to the reliance on multiple integrations. The universal token is generated to represent a one-to-many hierarchy of payment subscription relationships (such as to credit cards, banks, alternative payment methods, etc.). In this hierarchy, a universal token maintains a one-to-one relationship with a payment account reference (PAR). Merchants can have more than one subscription agreement with a cardholder, and each agreement may be through a different device for the same underlying primary account number (PAN), such as various alternative payment methods. Accordingly, the PAR may be in a one-to-many relationship with the various payment methods (credit card, subscription, alternative payment methods, etc.), each payment method having the same underlying PAN.

Generally, in one aspect, a system for authenticating a payment transaction is provided. The system includes a payment device. According to some examples, the payment device is an electronic cash register (ECR) or a payment terminal. The payment device may be configured to retrieve the account number from a customer card or a customer device. The payment device is configured to provide a payment processing request. The payment processing request includes a tokenization request and an account number. The account number is associated with a customer making the payment processing request. According to some examples, the account number is a PAN or device PAN (DPAN).

The system further includes a provider gateway. The provider gateway is configured to receive the payment processing request from the payment device. The provider gateway is further configured to provide the account number and the tokenization request to a payment network. According to some examples, the payment network is a credit card service, debit card service, subscription service, e-commerce solution, or alternative payment method. The provider gateway is further configured to receive, via the payment network, a network token and a payment account reference (PAR). The network token is based on the account number. The PAR corresponds to the account number. According to some examples, the network token comprises an expiration date.

The system further includes a universal token vault. The universal token vault is configured to receive, via the provider gateway, the network token and the PAR. The universal token vault is further configured to create or update a universal token to associate the network token with the PAR. According to some examples, the universal token vault is further configured to provide the universal token to a merchant server. The universal token may associate a plurality of network tokens with the PAR.

According to some examples, the universal token vault is further configured to create a stored credential universally unique identifier (SC UUID). Further to this example, the universal token vault may be further configured to provide the SC UUID to a merchant server.

According to some examples, the payment processing request further includes a payment authorization request. The universal token may be created or updated in response to the provider gateway receiving a payment authorization response from an acquirer. The acquirer may be configured to generate the payment authorization response based on receiving the payment authorization request via the provider gateway.

Generally, in another aspect, a system of authorizing a payment transaction is provided. The system includes a provider gateway. The provider gateway is configured to receive, via a merchant server, a universal token and a payment authorization request.

The system further includes a universal token vault. The universal token vault is configured to receive, via the provider gateway, the universal token. The universal token vault is further configured to retrieve a network token. The network token corresponds to the universal token. The universal token vault is further configured to provide the network token to the provider gateway. According to an example, the network token corresponds to an account number associated with a customer. The account number may be a PAN or DPAN.

The system further includes an acquirer in communication with a payment network. The acquirer is configured to receive, via the provider gateway, the network token and the payment authorization request. The acquirer is configured to generate a payment authorization response based on the network token and the payment authorization request. The acquirer is further configured to provide, via the provider gateway, the payment authorization response to the merchant server.

According to an example, the provider gateway may be further configured to receive a cryptogram from the payment network. Additionally, the provider gateway may be further configured to provide the cryptogram to the acquirer. Generating the payment authorization response by the acquirer may be further based on the cryptogram.

Generally, in another aspect, a provider gateway is provided. The provider gateway is communicatively coupled to a payment device and a universal token vault. The provider gateway configured to (1) receive a payment processing request from the payment device, wherein the payment processing request comprises a tokenization request and an account number associated with a user making the payment processing request; (2) provide the account number and the tokenization request to a payment network; (3) receive, via the payment network, a network token based on the account number and a PAR corresponding to the account number; (4) provide the network token and the PAR to the universal token vault; (5) receive, via the universal token vault, a universal token, wherein the universal token associates the network token with the PAR; and (6) provide universal token to a merchant server.

According to an example, the provider gateway may be further configured to (1) receive, via the merchant server, a universal token and a payment authorization request; (2) provide the universal token to the universal token vault; (3) receive, via the universal token vault, the network token corresponding to the universal token; (4) provide the network token and the payment authorization request to an acquirer communicatively coupled to the payment network; (5) receive, via the acquirer, a payment authorization response based on the network token and the payment authorization request; and (6) provide the payment authorization response to the merchant server.

In various implementations, a processor or controller may be associated with one or more storage media (generically referred to herein as "memory." e.g., volatile and non-volatile computer memory such as RAM, PROM, EPROM, EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

Figure 1:
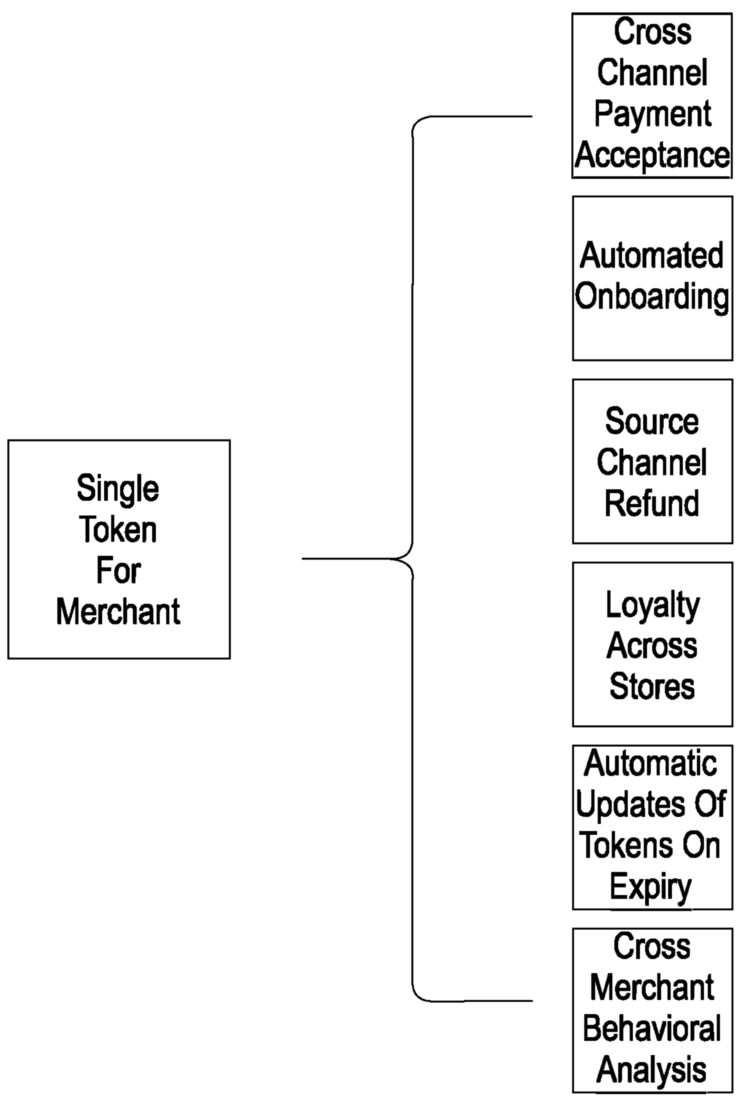
FIG. 1 is a diagram illustrating features and benefits of a universal token, in accordance with an example.

The present disclosure is generally directed to systems and methods for generating and utilizing a universal token for payment authorization. The universal token eliminates the need for the complex orchestration by merchants operating cross-channel payments that are contingent on varying operating models, leading to the reliance on multiple integrations. The universal token is generated to represent a one-to-many hierarchy of payment subscription relationships (such as to credit cards, banks, alternative payment methods, etc.). In this hierarchy, a universal token maintains a one-to-one relationship with a payment account reference (PAR). Merchants can have more than one subscription agreement with a cardholder, and each agreement may be through a different device for the same underlying primary account number (PAN), such as various alternative payment methods. Accordingly, the PAR may be in a one-to-many relationship with the various payment methods (credit card, subscription, alternative payment methods, etc.) with the same underlying PAN.

When a merchant wishes to generate a universal token corresponding to a customer during a payment transaction, a tokenization request is generated. In some examples, this tokenization request is generated by a merchant-facing device, such as an electronic cash register (ECR). In other examples, the tokenization request is generated by a customer-facing device, such as a payment terminal. If the customer wishes to pay with a credit card or debit card, the ECR or payment terminal captures a PAN from the card. If the customer wishes to pay through an alternative means, such as an alternative payment service provider (such as Google Pay or Apple Pay), the ECR or payment terminal captures a device PAN (DPAN) from a customer device (such as a smartphone) operated by the customer. The DPAN is a device-specific number associated with an underlying PAN of a credit card or debit card.

The tokenization request, a payment authorization request, and the PAN or DPAN is then provided to the provider gateway. The provider gateway may be a remote server maintained by a payment provider service, such as Verifone. The provider gateway then passes on the tokenization request and the PAN or DPAN to a payment network. The payment network is typically operated by a payment processor service, such as Visa, Mastercard, Discover, or American Express. The payment network generates a network token by tokenizing the provided PAN or DPAN. The payment network also retrieves a PAR corresponding to the provided PAN or the underlying PAN or the DPAN. The PAR is then provided to the provider gateway.

The provider gateway then provides the network token and the PAR to a universal token vault. The universal token vault uses a stored credential collection database to see if a universal token is stored in the universal token vault corresponding to the PAR. If not, a new universal token is created associating the PAR with the network token. If so, the existing universal token is updated to associate the PAR with the network token, along with any other previously associated network tokens. For example, a single PAR may be associated with a credit card PAN, a Google Pay DPAN, and an Apple Pay DPAN. The created or updated universal token is then provided to the provider gateway. The provider gateway then provides the universal token to the payment terminal, ECR, and/or a merchant server (such as an aspect of a merchant backend system or a merchant ecommerce system) for storage.

When the customer wishes to make another payment, or when an ecommerce system wishes to process a transaction previously approved by the customer, the universal token may then be retrieved from the merchant server by the provider gateway to authorize the payment. The universal token may be identified and retrieved by any practical means, such as by using a look-up table storing customer information (such as retinal scan, fingerprint scan, full body scan, etc.) corresponding to the universal token. This customer information may have been captured during the initial transaction creating the universal token. The retrieved universal token is then provided to the provider gateway with a payment authorization request. The provider gateway then retrieves, from the universal token vault, a network token corresponding to the PAN or DPAN of the desired payment method (credit card, debit card, Apple Pay, Google Pay, etc.) of the customer. The provider gateway then provides the network token to the acquirer to authorize the payment. In some examples, the provider gateway also receives a cryptogram from the payment network. The acquirer may require the provider network to provide the cryptogram with the payment authorization request for an additional layer of security.

In practice, a merchant initially engages the tokenization process as a part of the onboarding process. Merchants will be able to request a token as part of a payment to reduce any extra integration effort and a second call to the authentication server. The universal token can also be used to facilitate loyalty and payment programs. Further, the hierarchy may be customized by the merchant, as the merchant can assign names to each subscription series.

Currently, if a merchant needs to use network tokenization, they need to perform a number of steps. First, merchants need to onboard to the payment networks one-by-one. Some networks have matured to the point of having application programming interfaces (APIs) to facilitate the onboarding, while other networks require manual onboarding.

Second, merchants must integrate to the payment networks. No standardized APIs currently exist for this integration. Accordingly, each payment network must have their own custom APIs. Each individual API is meant to perform a specific task for which it is built, turning each integration into a months-long process. Each integration will also require a significant amount of analysis and assistance.

Third, merchants must change or implement a backend to support storing multiple tokens per customer. With increasing numbers of wallet providers, this process will be complex and prove to be costly.

Fourth, the merchants must be configured to provide token status update implementation. Each merchant needs to expose an endpoint to receive updates from each payment network. This adds additional complexity in terms of networking, security, failover, up-keeping, etc.

Fifth, merchants will need to write custom logic to ensure changes in tokens and PAR do not disrupt their loyalty programs.

Sixth, merchants will need to account for an increase in time to market to use network tokenization. To reduce this time to market, merchants and retailers often use hybrid models extending integration to multiple players each fulfilling a different capability, resulting in incoherent service with a complex ecosystem to manage.

Seventh, a global merchant will be required to partner with local players in every region to maintain customer data privacy policies and card credentials.

Typically, each integration effort requires a months-long effort resulting in a hybrid integration involving dozens of players with varied integration touch points without a coherent integration logic.

The aforementioned universal token solves a number of these problems. First, separate onboarding efforts are no longer required to integrate tokens.

Second, the universal token is built upon a single coherent API. Further, the merchant does not need to integrate the API, instead the universal token can be generated with a payment request.

Third, the universal token is a single token to be managed by the merchant. All of the complexities of the multiple tokens and token types are abstracted by the token generation process.

Fourth, the universal token does not need to be changed when the underlying PAN changes (for example, when a customer credit card expires and a new card is issued), instead these changes are abstracted by the universal token provider.

Fifth, the universal token does not need to be changed when the PAR changes, resulting in uninterrupted loyalty tracking.

Sixth, the universal token accounts for regional data protection nuances. Where applicable, the mapping to regional tokens could be split into regional cloud services without breaking any local customer data retention policies while maintaining a coherent merchant experience. In an example where the merchant is global (such as an Internet seller with domains for different countries), a Consumer X (with Australian Bank Issued Payment Credentials) could subscribe to Product A from a US website of the Seller and Product B from a UK website of the Seller with one single user login and the same set of payment credentials while registering. For merchants with global presence over the Internet, they use the single universal token, and the interoperability and orchestration with regional tokens is taken care of by the universal token provider.

The various improvements of the universal token over existing tokenizing processes are further illustrated in Table 1 below:

| | Existing processes | Universal token |
|---|---|---|
| Onboarding | A mix of manual and API driven onboarding with each payment network | Covered as part of merchant onboarding. Single questions are provided to merchants wishing to enroll for tokenization. Interactive onboarding educates the merchant during the onboarding process. |
| PAR Integration | API integration with each payment network | Universal tokens are created on the back of payment processing. Universal tokenization only requires fields to receive the universal token and stored credential identifier. |
| Network Token Integration | Multiple API endpoint integration with each payment network | Single integration to Universal Token API |
| Storage | One PAN-many tokens leading to complex and costly storage and processing | All storage and computing complexity is abstracted into universal token |
| Token Status Updates | Expose an endpoint per payment system to get the updates Handle security and failover | All status updates are managed by universal token provider. Merchants do not necessarily need to enroll. The newest PAN details will be returned as part of the authorization response message. Only merchants who intend to show card info or card art in their in their checkout page need to enroll to the status updates. If a consumer decided to change their payment credentials or delete, it's just an action that consumer takes; merchants do not require any intervention. |
| Card Lifecycle Management | Renewals and replacements leading to a prompt by merchant to consumer to update their payment credentials, and then follow-up API calls to update the network token(s) associated with the old payment credentials | All the card lifecycle management abstracted behind the universal token |
| Loyalty Program | Payment networks must reuse or replenish the PAR upon replacing the PAN. This means merchants receive a new PAR for a new PAN, thereby breaking any loyalty tracking they may have built based on the old PAR. To avoid this, merchants need bespoke code to handle the change of PAR. | Universal token will stay the same if the PAR and/or PAN change, thereby ensuring the loyalty program is not broken. |
| Card Holder Visibility | Card art is retrieved from the payment networks each time a consumer's card products are upgraded/changed by the issuer. These card arts are provided to the merchant to keep familiarity and build trust to increase consumer loyalty. | The universal token would not change, however with every consumer card upgrade or change it retrieves the card art in PNG file format and transports the PNG file automatically to the merchant without any separate integration or action. |
| Consumer Behavioral Analysis | Across the merchant's channels in-store or online. The purchase behaviors could be tracked and analyzed to optimize conversion rates. | A reporting portal would show the universal token against each transaction instead of PAR. So if the PAR changes, the historic record of transactions is not impacted. |
| Source Channel Refund | A one-click refund for merchants reducing the burden on customer service on order management entries and disputes arising out of confusion on the refund. | The universal token enables refunds only to the payment credential that was used for the transaction and attached to the order ID. This enables merchants to have better control of orders and returned inventory. |

FIG. 1 is a diagram illustrating features and benefits of a universal token. For instance, the features and benefits of using a universal token include cross-channel payment acceptance, automating onboarding, offering source channel refunds, tracking loyalty across stores, automating updates of universal tokens upon expiration, and providing opportunities for cross-merchant behavioral analysis.

Example steps for implementing a universal token in a payment authorization and tokenization process are provided in Table 2 below:

| | Source | Target | Description |
|---|---|---|---|
| 1 | Merchant | Provider Gateway | Merchant accepts payment using device, wearables, contactless payment, etc. |
| 2 | Provider Gateway | Payment Networks (credit card companies, etc.) | Tokenize and payment account reference (PAR) inquiry |
| 3 | Provider Gateway | Acquirer (also known as a payment processor or merchant acquirer) | Transaction response and transaction ID |
| 4 | Provider Gateway | Universal Token Vault | Create/update universal token |
| 5 | Universal Token Vault | Provider Gateway | Receive universal token |
| 6 | Provider Gateway | Merchant electronic cash register (ECR) | Receive and store universal token |

Figure 2:
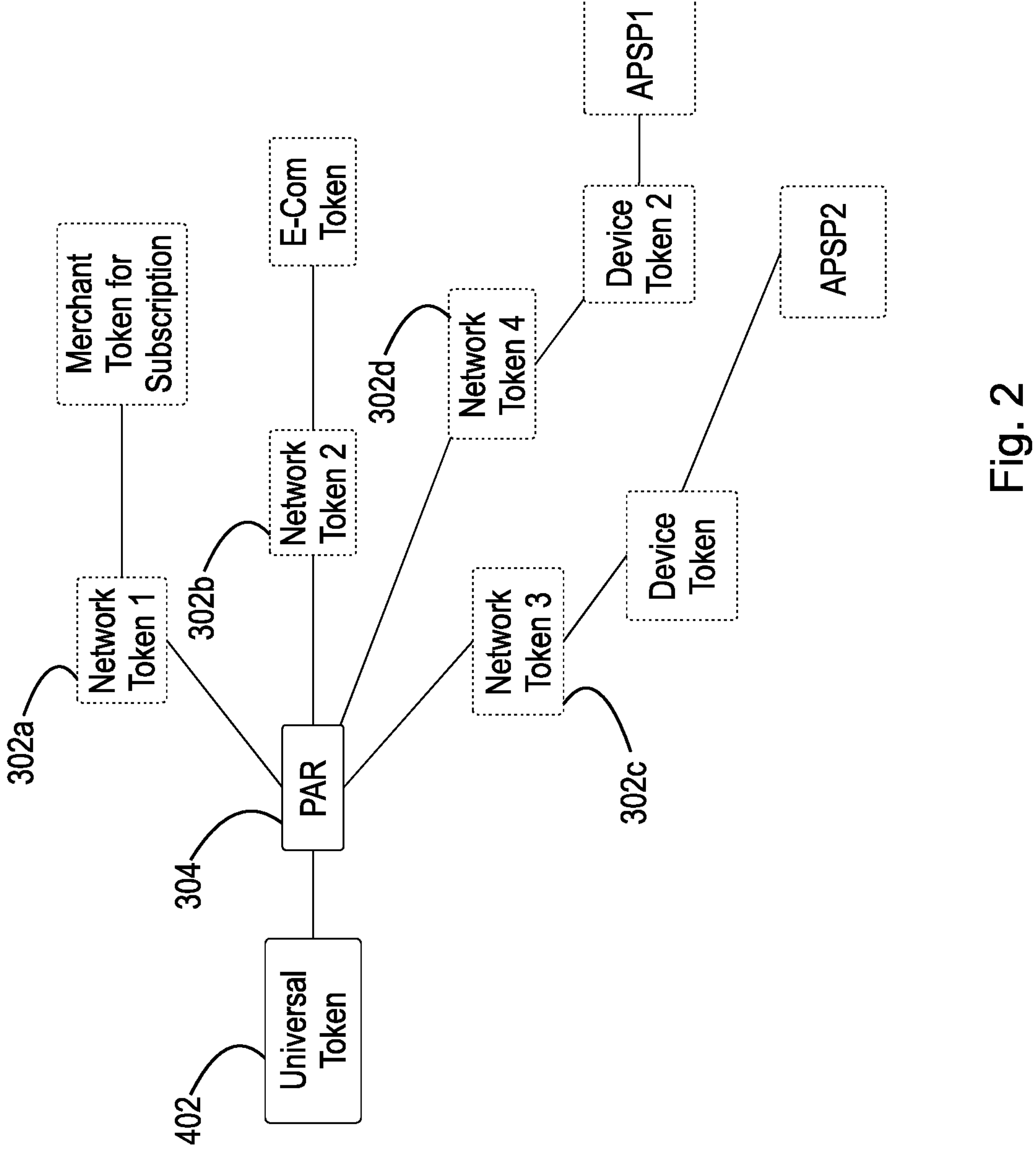
FIG. 2 is a diagram of a universal token hierarchy, in accordance with an example.

FIG. 2 is a diagram of a universal token hierarchy, in accordance with an example. As shown in FIG. 2, a universal token 402 corresponds to a PAR 304. The PAR 304 is in a one-to-one relationship with a primary account number (PAN). The PAR 304 is linked to several payment methods, including subscriptions, e-commerce solutions, and payment schemes (such as alternative payment methods) having the same underlying PAN. Each payment method can have their own associated network token 302 and/or device tokens. Device tokens incorporate information regarding a customer device 700*b* (such as a mobile device or smartphone). As shown, merchant tokens for subscription services, e-commerce tokens, and various alternative payment service providers (e.g., APSP1 and APSP2) can be included in the universal token hierarchy. In some examples, APSP1 is an alternative payment service provider such as Apple Pay while APSP2 is a different alternative payment service provider, e.g., Android Pay or Garmin Pay.

Figure 3:
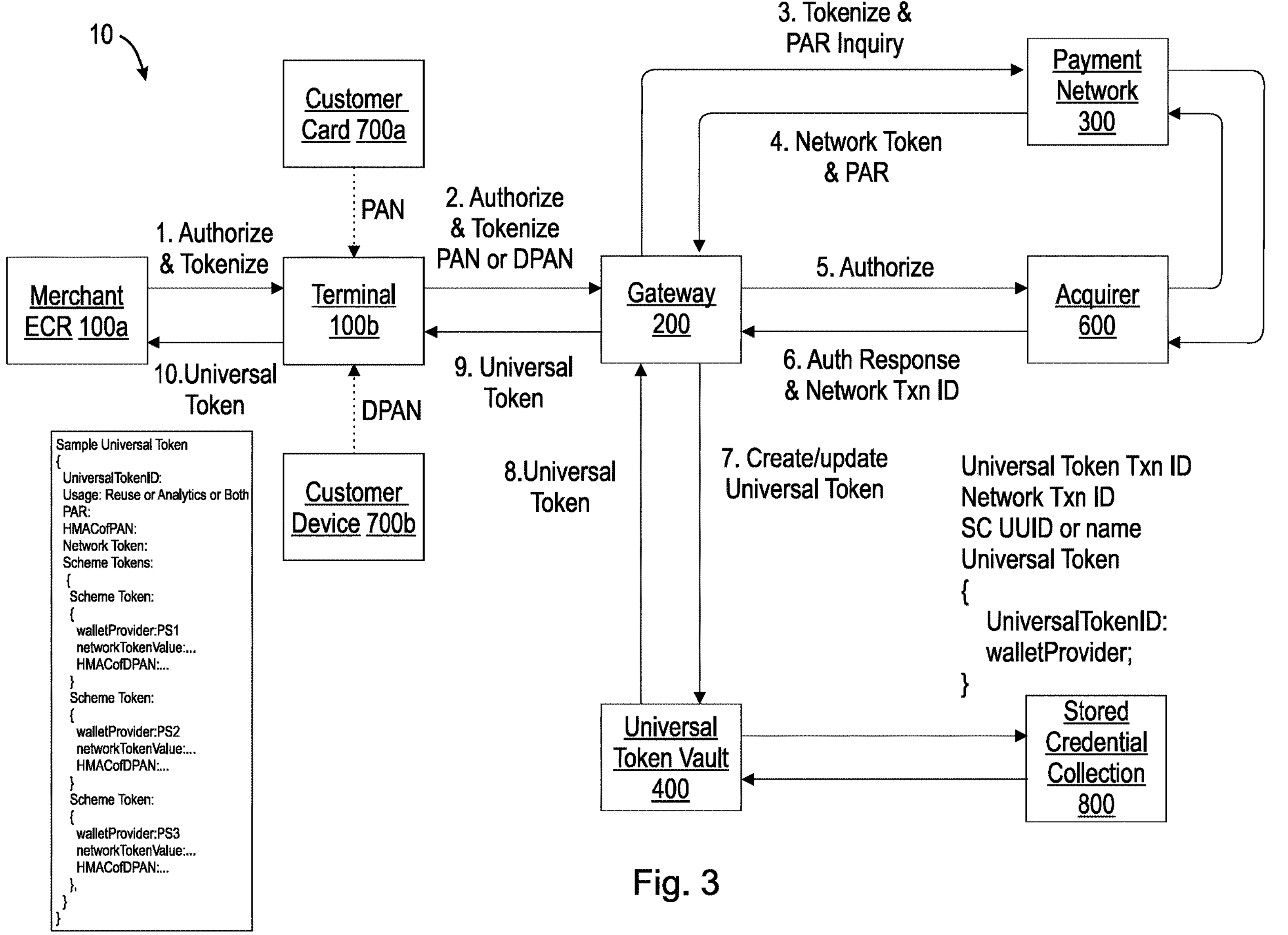
FIG. 3 is a block diagram demonstrating a system for payment authorization and tokenization, in accordance with several examples.

FIG. 3 is a block diagram demonstrating a system 10 for authorization and tokenization, in accordance with several examples. This diagram illustrates how a universal token 402 is created or updated during an in-store payment authorization process. As shown in the example of FIG. 3, a merchant electronic cash register (ECR) 100*a* transmits a tokenization request 104 and a payment authorization request 108 to a payment terminal 100*b*. The payment authorization request 108 may include information regarding the transaction, such as the total payment (such as $15.00 or €50) required for the transaction. The merchant ECR 100*a* is a merchant-facing device used to process payment transactions, while the payment terminal 100*b* is a customer-facing device also used to process payment transactions. The payment terminal 100*b* may include components to retrieve an account number 106 from a customer. In one example, the payment terminal 100*b* retrieves a PAN 106*a* from a customer card 700*a* (such as a credit card or debit card) when the customer swipes their customer card 700*a* through a magnetic reader or inserts their customer card 700*a* into a chip reader. In some examples, the PAN 106*a* is the 16-digit number printed on the customer card 700*a*. In other examples, the payment terminal 100*b* retrieves a PAN 106*a* from a customer card 700*a* held near a contactless card reader, such as a near field communication (NFC) card reader or radio frequency identification (RFID) card reader. In further examples, the payment terminal 100*b* retrieves a DPAN 106*b* from a customer device 700*b* (such as a smartphone or other mobile device). The DPAN 106*b* corresponds to an alternative payment method, such as Google Pay or Apple Pay, and references the specific customer device 700*b* and the underlying PAN 106*a* used to facilitate the transaction. The DPAN 106*b* may be retrieved by a contactless reader (such as an NFC or RFID reader) of the payment terminal 100*b*. In some examples, the merchant ECR 100*a* and the payment terminal 100*b* transmit data back-and-forth to facilitate payment processing. In other examples, payment terminal 100*b* may generate the tokenization and payment authorization requests 104, 108 without communication with a merchant ECR 100*a*.

The payment terminal 100*b* then forwards the tokenization request 104 and the payment authorization request 108, along with a PAN 106*a* or DPAN 106*b*, to a provider gateway 200. The provider gateway 200 may be a remote server operated and maintained by a payment provider service, such as Verifone.

The provider gateway 200 then forwards the tokenization request 104 to a payment network 300. The payment network 300 is typically operated by a payment processor service, such as Visa, Mastercard, Discover, or American Express. The tokenization request 104 is generated based on the PAN 106*a* or DPAN 106*b* captured by the payment terminal 100*b* such that the payment network 300 responds with a network token 302 corresponding to the forwarded PAN 106*a* or DPAN 106*b*.

The provider gateway 200 also issues a PAR inquiry request 202 to the payment network 300. Similar to the tokenization request 104, the PAR inquiry request 202 is generated based on the PAN 106*a* or DPAN 106*b* captured by the payment terminal 100*b* such that the payment network 300 responds with a PAR 304 corresponding to the PAN 106*a* or DPAN 106*b*. In some examples, the PAR 304 is a 29-character value assigned to a PAN 106*a*. The PAR 304 may include four characters representative of a bank identification number (BIN), while the remaining characters may be randomly assigned. If the PAR 304 is intercepted by a third-party, the third-party will be unable to directly use the PAR 304 for payments, as they would if they intercepted the PAN 106*a* or DPAN 106*b*. Thus the PAR 304 provides a layer of abstraction and security relative to the underlying PAN 106*a* or DPAN 106*b*.

The provider gateway 200 may then provide the payment authorization request 108 and the network token 302 (provided by the payment network 300) to an acquirer 600. Similar to the provider gateway 200, the acquirer 600 may be a remote server maintained by a payment provider service, such as Verifone. The acquirer 600 is configured to communicate with the payment network 300 to authorize and process transactions for the customer and the merchant using the provided network token 302. For example, if the network token 302 corresponds to a DPAN 106*b*, the payment network 300 determines the underlying PAN 106*a* of the DPAN 106*b* to process the payment.

The acquirer 600 then provides a payment authorization response 602 to the provider gateway 200. The payment authorization response 602 indicates whether or not that the acquirer (in communication with the payment network 300) authorized payment based on the provided network token 302 and any other information (such as payment total) provided with the payment authorization request 108. The acquirer 600 also provides the provider gateway 200 with a network transaction identification (ID) 604. The network transaction ID 604 is used to facilitate payments via a subscription service, indicating that the customer has consented to future payments under the subscription plan.

The provider gateway 200 then issues a request to a universal token vault 400 to either create a universal token 402, or update an existing universal token 402. The request is accompanied by, at least, the network token 302 and PAR 304 retrieved from the payment network 300. Similar to the provider gateway 200 and the acquirer 600, the universal token vault 400 may be a remote server maintained by a payment provider service, such as Verifone. In other examples, the universal token vault 400 may be maintained by a third-party service provider. The universal token vault 400 may be a database storing the universal tokens 302 and their corresponding PANs 106*a* or DPANs 106*b*. The universal token vault 400 provides a newly created or updated universal token 402 to the provider gateway 200. This newly created or updated universal token 402 now links the network token 302 with the PAR 304. In the case of a new universal token 402, a single PAR 304 will be associated with a single network token 302. In the case of an updated universal token 402, the single PAR 304 is now associated with two or more network tokens 302, such as a first network token 302*a* corresponding to a PAN 106*a* of a credit card, and a second network token 106 corresponding to a DPAN 106*b* of Apple Pay with the same underlying PAN 106*a* as the credit card. The universal token 402 may also be configured to indicate the preferred payment method of the customer. The universal token 402 is then provided to provider gateway 200. The provider gateway then passes the universal token 402 onto the payment terminal 100*b*, which in turn provides the universal token 402 to the merchant ECR 100*a*. Accordingly, the merchant ECR 100*a* or the payment terminal 100*b* may use the universal token 402 at a later time to obtain payment authorization.

The universal token vault 400 may also be in communication with a stored credential collection 800. Similar to the provider gateway 200, the acquirer 600, and the universal token vault 400, the stored credential collection 800 may be a remote server maintained by a payment provider service, such as Verifone. In other examples, the stored credential collection 800 may be maintained by a third-party service provider. The stored credential collection 800 may be used to retrieve or create a stored credential universally unique identifier (SC UUID) 404 corresponding to the universal token 402. Further, the stored credential collection 800 may also be used to pair the universal token 402 with the network transaction ID 604 and/or a universal token transaction ID 406. The universal token transaction ID 406 may be used to identify the creation or update of the universal token 402 being created or retrieved from the universal token vault 400.

FIG. 3 also provides an illustration of a sample universal token 402 that includes several "scheme" tokens (network tokens 302 associated with a payment method other than the PAN 106*a*) in accordance with this example in the form of a high-level programing language or software code. Each of the "scheme" tokens represents a different payment method, such as Apple Pay, Google Pay, Garmin Pay, subscription service, etc., and includes information regarding the payment wallet used and a network token value. By implementing the steps of the block diagram of FIG. 3, the token provider can create a new universal token 402 when a customer uses their PAN 106*a* or DPAN 106*b* to make a purchase. The sample universal token 402 also includes a universal token ID, usage data, the PAR 304, a hash-based message authentication code (HMAC) encoded version of the underlying PAN 106*a*, and a network token 302 associated with the HMAC version of the PAN 106*a*.

Figure 4:
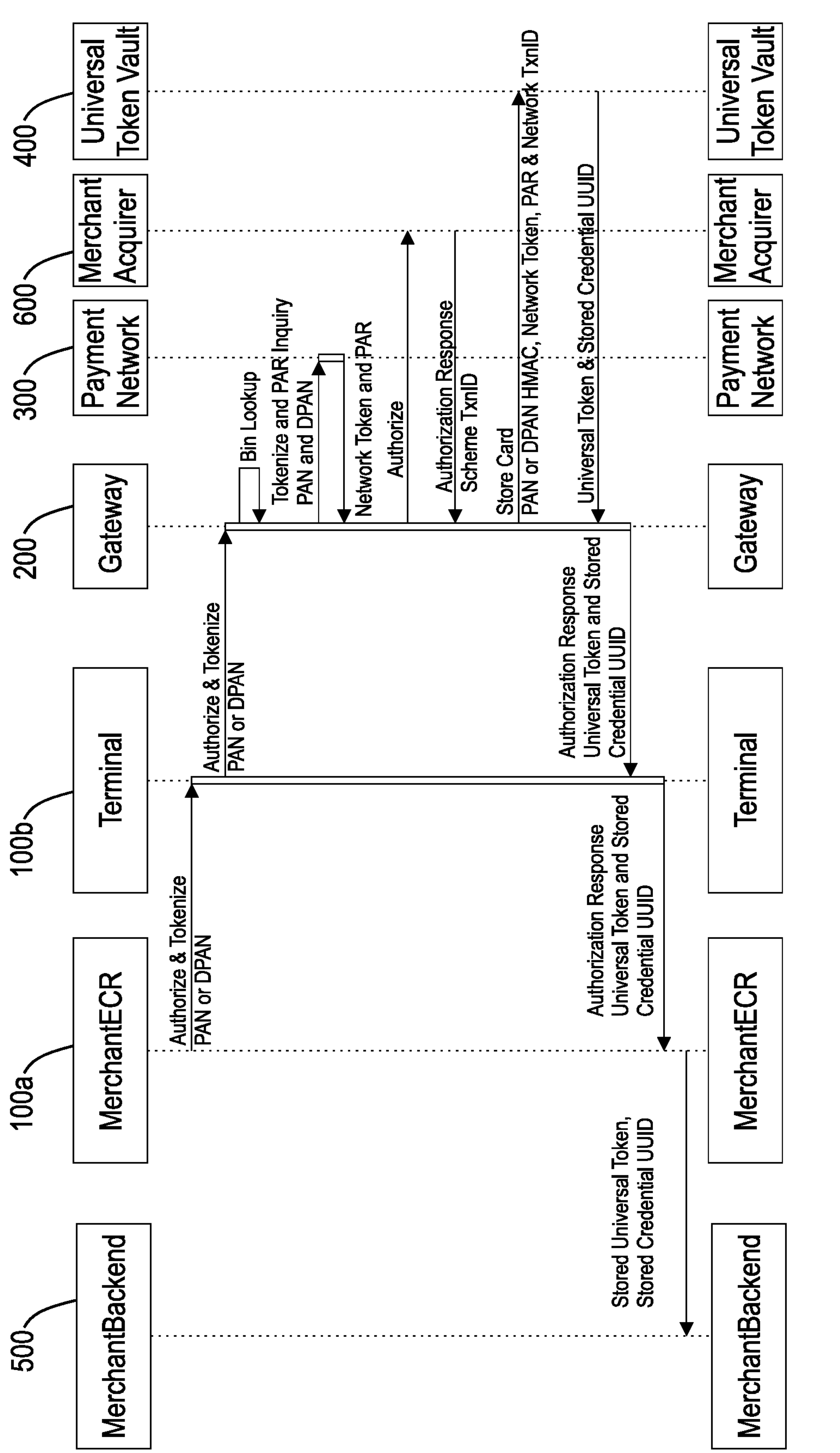
FIG. 4 is a sequence diagram of payment authorization and tokenization, in accordance with an example.

FIG. 4 is a sequence diagram of an example system for authorization and tokenization, similar to the block diagram of FIG. 3. As shown in FIG. 4, the merchant ECR 100*a* transmits a payment authorization request 108 and a tokenization request 104, along with a PAN 106*a* or DPAN 106*b*, to the provider gateway 200 via the payment terminal 100*b*. In this example, the merchant ECR 100*a* has captured the PAN 106*a* or DPAN 106*b* from a customer card 700*a* or customer device 700*b*.

The provider gateway 200 then generates a BIN lookup request. In some examples, the BIN lookup request uses a portion (such as the first four numbers or characters) of the PAN 106*a* or DPAN 106*b* to identify a corresponding payment network 300. The provider gateway 200 then issues the tokenize request 104 and the PAR inquiry, along with the PAN 106*a* or DPAN 106*b*, to the identified payment network 300.

The provider gateway 200 then receives, from the payment network 300, a network token 302 and a PAR 304. The network token 302 is a tokenized version of the provided PAN 106*a* or DPAN 106*b*, while the PAR 304 corresponds to the provided PAN 106*a* or DPAN 106*b*.

The provider gateway 200 then issues the payment authorization request 108 to the merchant acquirer 600. As described above with respect to FIG. 3, the merchant acquirer 600 provides, based on communication with the payment network 300, the provider gateway 200 with a payment authorization response 602 and a network transaction ID 604. The payment authorization response 602 is then transmitted to the merchant ECR 100*a* via the terminal 100*b*, enabling the merchant ECR 100*a* to complete the payment transaction.

The provider gateway 200 then issues a store card command to a universal token vault 400 to store the relationship of the network token 302 and PAR 304 in a universal token 402. In issuing the store card command, the provider gateway 200 provides the universal token vault 400 with an HMAC version of the PAN 106*a* or the DPAN 106*b*, the network token 302 (initially provided by the payment network 300), the PAR 304 (also initially provided by the payment network 300), and the network transaction ID 604 (initially provided by the merchant acquirer 600). In some examples, the provider gateway 200 is configured to generate the HMAC version of the PAN 106*a* or the DPAN 106*b*. The universal token vault 400 responds to the store card command by providing a universal token 402 and an SC UUID 404, which is transmitted to the provider gateway 200, the payment terminal 100*b*, the merchant ECR 100*a*, and eventually to a merchant server 500 of a merchant backend system. The merchant may utilize the SC UUID 404 to set-up subscription service payments for the customer.

In some examples, the merchant ECR 100*a* or the payment terminal 100*b* may be configured to capture or receive customer identity information (such as retinal scan, fingerprint scan, full body scan, facial scan, etc.). This customer information may have been captured during the initial transaction creating the universal token 402, and may be stored by the merchant ECR 100*a* or the payment terminal 100*b* in a look-up table corresponding to the universal token 402. Further, if a user is associated with multiple universal tokens 402 (such as one universal token 402 associated with a credit card and another associated with a debit card), the customer may indicate which universal token 402 is the preferred or default method of payment. Even further, if a universal token 402 is associated with multiple network tokens 302 (such as a network token associated with a PAN 106*a* for a credit card, a first DPAN 106*b* for Apple Pay, and a second DPAN 106*c* for Google Pay), the customer may indicate a preferred or default network token 302 to process payment.

Figure 5:
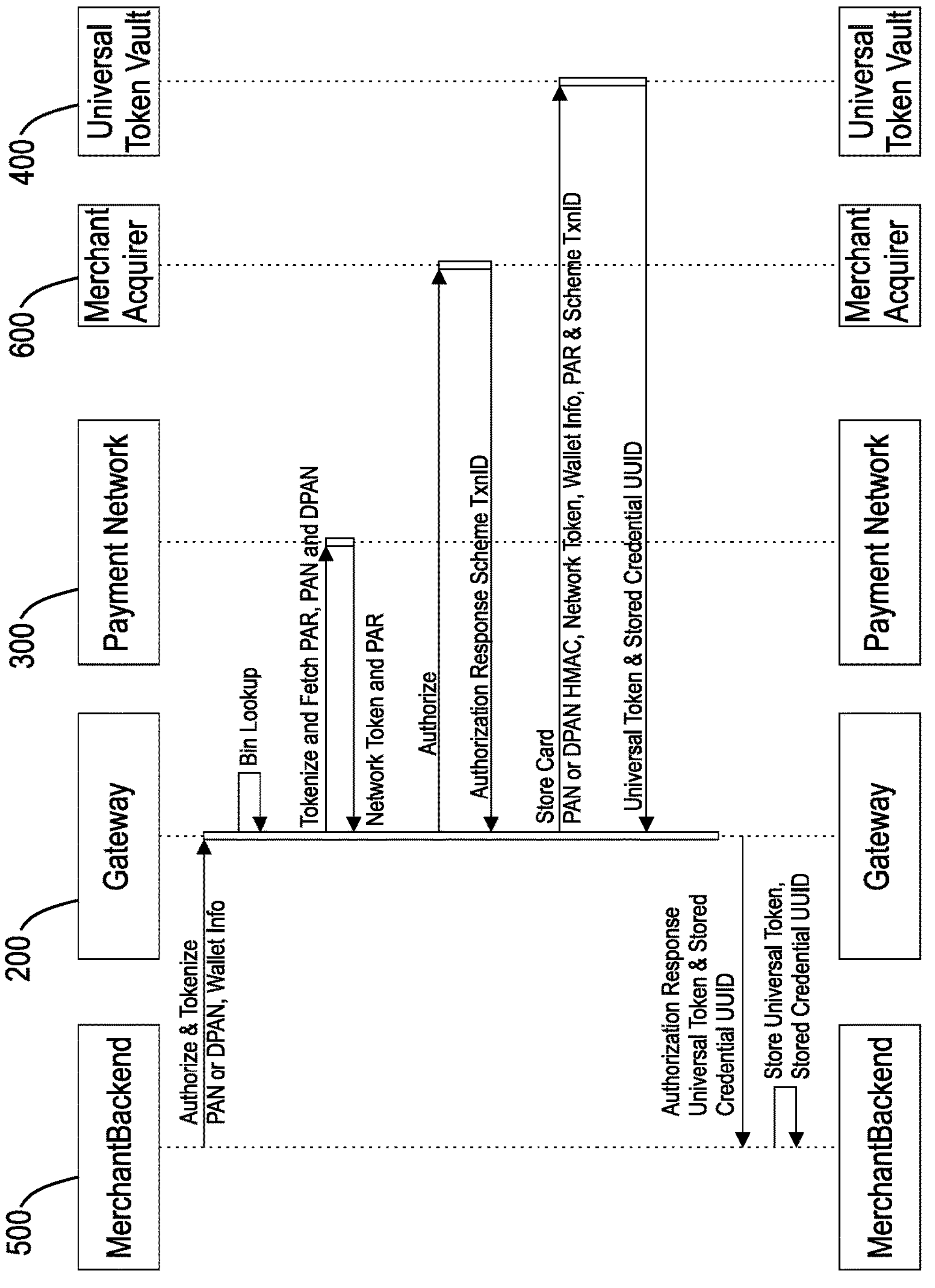
FIG. 5 is a sequence diagram of e-commerce payment authorization and tokenization, in accordance with an example.

FIG. 5 is a sequence diagram of e-commerce authorization and tokenization for e-commerce (online) situations. FIG. 5 is a variation of the sequence diagram of FIG. 4, as a merchant server 500 of the merchant backend system, rather than a physical in-store merchant ECR 100*a* or payment terminal 100*b*, generates the initial tokenization and payment authorization requests 104, 108, transmits the requests 104, 108 to the provider gateway 200, and receives a payment authorization response 602 (generated by the merchant acquirer 600), a universal token 402 (created or updated by the universal token vault 400), and a SC UUID 404 (also provided by the universal token vault 400). Further, the provider gateway 200 also provides the universal token vault 400 with wallet info provided by the merchant server 500. The merchant server 500 captures wallet info related to the digital payment wallet used by the customer. This wallet info may be stored in the universal token 402.

Figure 6:
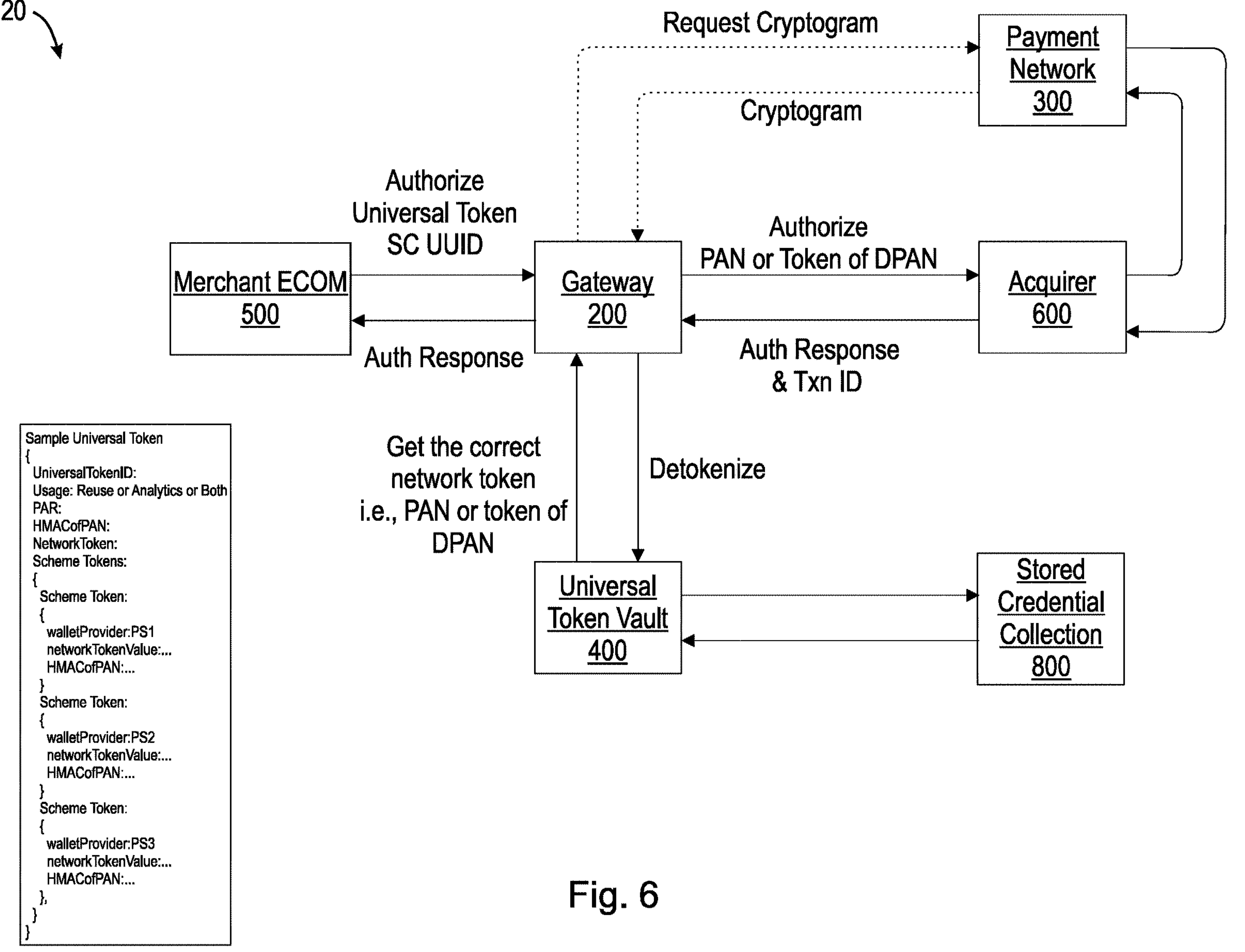
FIG. 6 is a block diagram demonstrating e-commerce payment authorization using a universal token, in accordance with an example.

FIG. 6 is a block diagram demonstrating a system 20 for e-commerce authorization using a universal token 402, such as the universal token 402 generated in FIGS. 3-5. In FIG. 6, a merchant server 500 of a merchant e-commerce system provides a payment authorization request 108, a universal token 402, and an SC UUID 404 to the provider gateway 200. The provided universal token 402 and SC UUID 404 correspond to the customer attempting to complete a payment transaction, and may be retrieved from the merchant server 500 based on information identifying the customer, such (such as retinal scan, fingerprint scan, full body scan, facial scan, etc.). This customer information may have been captured during the initial transaction creating the universal token 402.

Optionally, the provider gateway 200 requests and receives a cryptogram 308 from a payment network 300. This encryption using a cryptogram 308 may be required in certain jurisdictions for an additional layer of security. The cryptogram 308 may be used to authenticate data provided to an acquirer 600 to authorize the payment transaction, such as a PAN 106*a* or DPAN 106*b*.

The provider gateway 400 then issues a detokenization request to a universal token vault 400, along with the universal token 402 and the SC UUID 404. The universal token vault 400 then retrieves a network token 302 associated with the universal token 402. If the universal token 402 is associated with multiple network tokens 302 (for example, a first network token 302*a* associated with a PAN 106*a* for a credit card and a second network token 302*b* associated with a DPAN 106*b* for Apple Pay), the universal token vault 400 may retrieved the network token 302 corresponding to the customers preferred method of payment.

Once the preferred network token 302 is retrieved, the provider gateway 400 provides the network token 302 and payment authorization request 108 to an acquirer 600 in communication with the payment network 300. In some examples, the cryptogram 308 received from the payment network 300 may also be provided for additional security, as the acquirer 600 may decode the cryptogram 308 due to its relationship with the payment network 300. If the acquirer 600 cannot decode the cryptogram 308, payment authorization may be denied.

In response to the network token 302 and payment authorization request 108 (and optionally the cryptogram 308), the acquirer 600 generates a payment authorization response 602 (such as approved or denied) and a network transaction ID 604, which are provided to the provider gateway 200. The payment authorization response 500 is then provided to the merchant server 500 to finalize payment processing.

Figure 7:
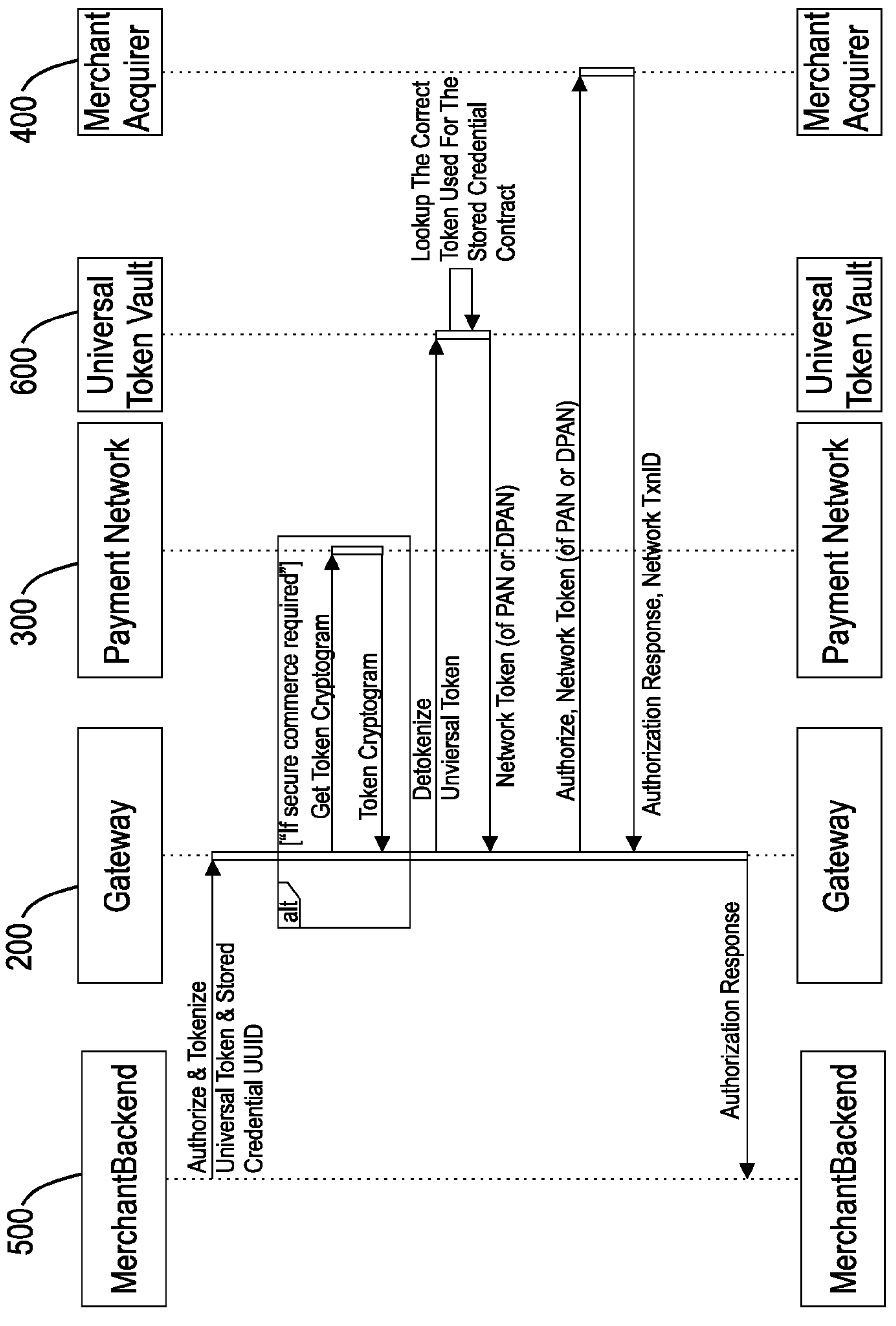
FIG. 7 is a sequence diagram of e-commerce payment authorization using a universal token, in accordance with an example.

FIG. 7 is a sequence diagram of the e-commerce authorization block diagram of FIG. 6. In FIG. 7, the initial payment authorization request 108 is provided by a merchant server 500 of a merchant backend system, and the merchant backend system receives the payment authorization response 602 generated by the acquirer 400. The merchant backend system also provides the universal token 402 and the SC UUID 404. Further, upon receiving the universal token 402 from the provider gateway 200, the universal token vault 400 looks up the correct network token 302 used for the stored credential contract.

The systems and processes depicted in FIGS. 6 and 7 may be used to implement one or more use cases. In a first use case, a new customer walks into a store, likes a specific item which is unavailable (such as a different size, color, or model of an available item), and reserves that item to be shipped when it is in stock. The customer presents a PAN 106*a* (in the form of a credit card) for payment. Accordingly, the merchant ECR 100*a* wishes to tokenize the PAN 106*a* as the cardholder's preferred payment instrument. The customer (cardholder) taps/inserts/swipes their PAN 106*a* on an associated payment terminal 106*b*. The payment terminal 106*b* instructs the provider gateway 200 to tokenize the PAN 106*a*. The provider gateway 200 tokenizes the PAN 106*a* (resulting in network token "A" of PAN 106*a*) and returns a reusable (for subsequent payment) universal token 402 to the merchant for storage on a merchant server 500. The merchant then provides the universal token 402 in their e-commerce channel (merchant backend sending a request to provider gateway directly) to complete the payment once the specific item is ready to be shipped. The provider gateway 200 uses the network token "A" 302*a* of PAN 106A to process the payment.

In a second use case, the merchant ECR 100*a* wants to tokenize the cardholder's preferred payment instrument. The cardholder taps their Apple iPhone on the payment terminal 100*b*. The payment terminal 100*b* instructs the provider gateway 200 to tokenize the Apple Pay DPAN 106*b*. The DPAN 106*b* is a token in itself, and is created by Apple for the PAN 106*a* with the issuer. The provider gateway 200 tokenizes the DPAN 106*b* (resulting in network token "B" 302*b* of DPAN 106*b*) and returns a reusable (for subsequent payment) universal token 402 to the merchant. The merchant provides the universal token 402 in their e-commerce channel (merchant backend sending a request to provider gateway directly) to complete the payment once the goods are ready to be shipped. The provider gateway 200 uses the network token "B" 302*b* of DPAN 106*b* to process the payment. In this use case, in addition to Apple Pay, the customer may use any form of payment with a DPAN 106*b* For example, the customer may also use Google Pay, Samsung Pay, Garmin Pay, etc.

In a third, more complex use case, a known customer walks into a store, likes an item, and reserves the item to be shipped when it is in stock. The customer presents a PAN 106*a* for payment, but they had used Apple Pay previously.

In this case, the cardholder had visited merchant and purchased something on September 1st, and paid using Apple Pay. The Apple Pay DPAN 106*b* was tokenized by provider gateway 200 producing a network token "B" 302*b* as in the second use case. The provider gateway 200 had returned a universal token 402. Cardholder now visits merchant on September 3rd, and reserves a specific item. The merchant ECR 100*a* wants to tokenize the cardholder's preferred payment instrument. The cardholder taps/inserts/swipes their PAN 106*a* on the payment terminal 100*b*. The payment terminal 100*b* instructs the provider gateway 200 to tokenize the PAN 106*a*. The provider gateway 200 tokenizes the PAN 106*a* (resulting in network token "A" 302*a* of PAN 106*a*) and returns the same universal token 402 associated with network token "B" 302*b* to the merchant. By analyzing the PAR 304, the provider knows the underlying PAN 106*a* associated with network tokens "A" and "B" 302*a*, 302*b* is the same. The merchant provides the universal token 402 in their e-commerce channel (merchant backend sending a request to the provider gateway 200 directly) to complete the payment once the goods are ready to be shipped. The provider gateway 200 correctly uses the network token "A" 302*a* of PAN 106*a* to process the payment. In this use case, in addition to Apple Pay, the customer may have used any form of payment with a DPAN 106*b* during their initial visit. For example, the customer may have also used Google Pay, Samsung Pay, Garmin Pay, etc.

Figure 8:
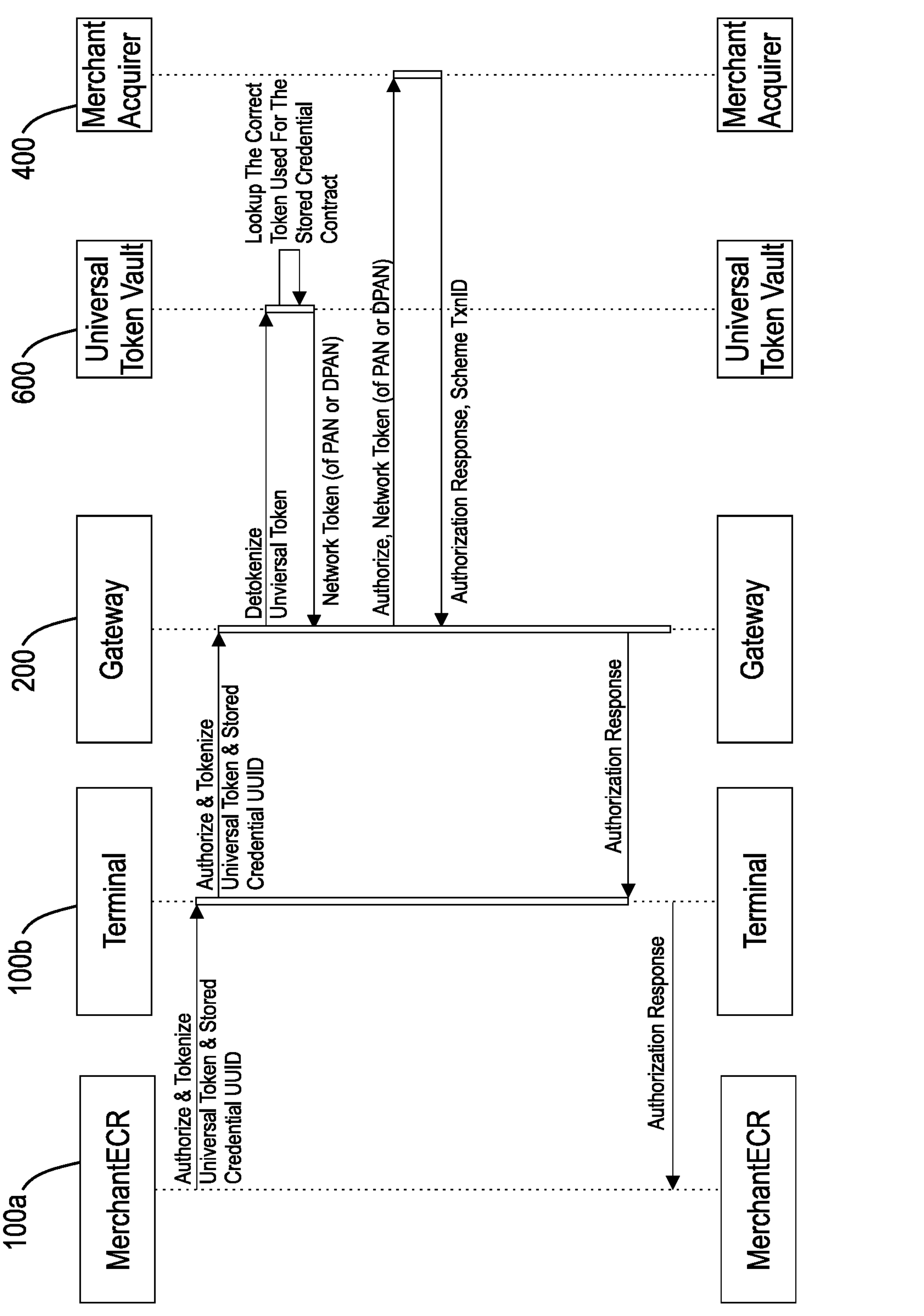
FIG. 8 is a sequence diagram of electronic cash register payment authorization using a universal token, in accordance with an example.

FIG. 8 is a sequence diagram of ECR authorization using a universal token 402. FIG. 8 is a variation of the sequence diagram of FIG. 7, wherein the initial payment authorization request 108 is provided by a merchant ECR 100*a*, and the merchant ECR 100*a* receives the authorization response 602.

Figure 9:
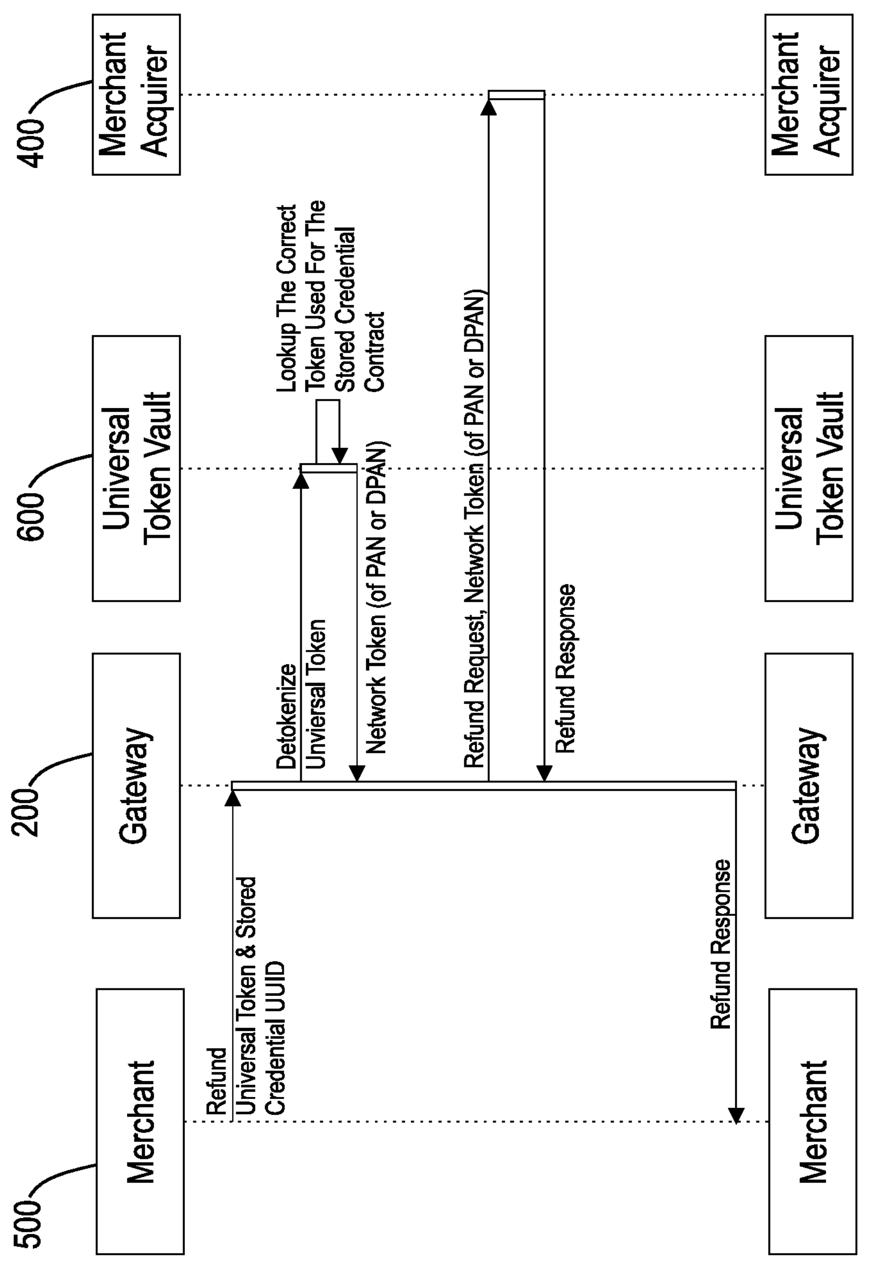
FIG. 9 is a sequence diagram of source instrument refund, in accordance with an example.

FIG. 9 is a sequence diagram of source instrument refund. FIG. 9 is a variation of the sequence diagram of FIG. 7, wherein the merchant issues a refund request rather than a payment authorization request 108. Further, the merchant receives a refund response from the provider gateway 200, via the merchant acquirer 600.

Figure 10:
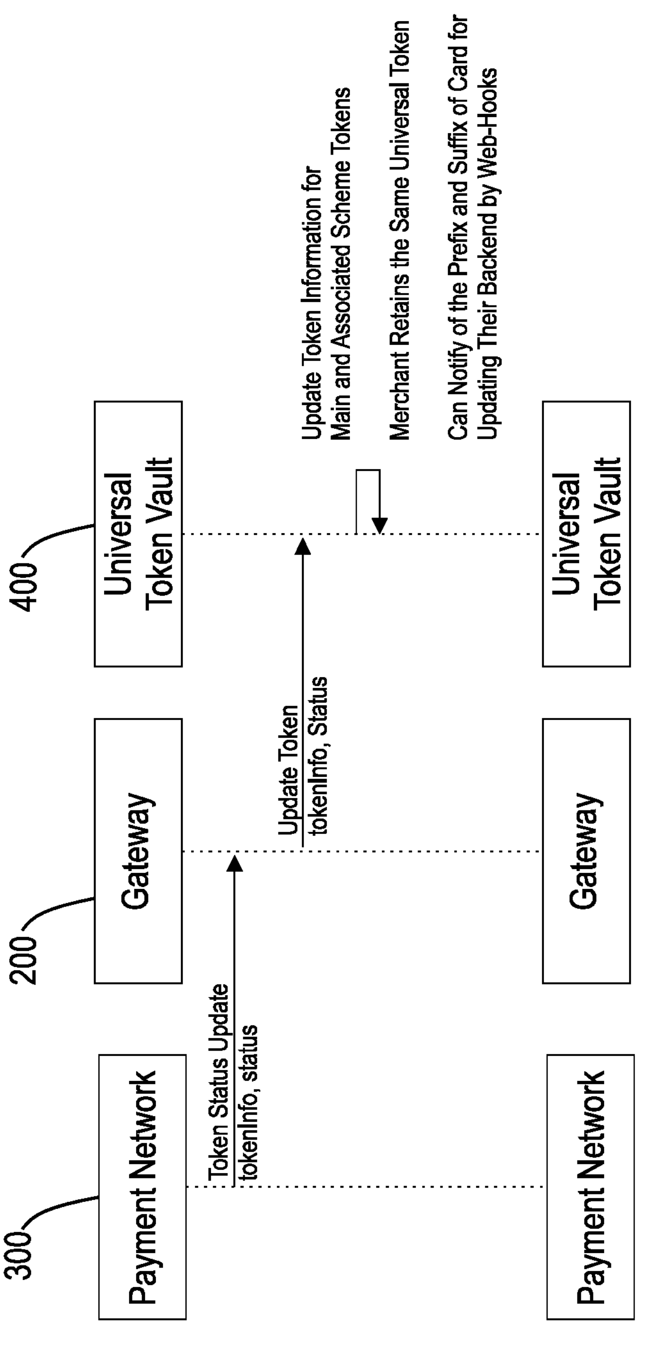
FIG. 10 is a sequence diagram of a universal token update, in accordance with an example.

FIG. 10 is a sequence diagram for updating a universal token 402. FIG. 10 shows a provider gateway 200 being provided with a network token status update request via a payment network 300. The provider gateway 200 then issues a universal token update request to the universal token vault 400. The universal token vault 400 updates the universal token 302 based on the information provided by the payment network 300.

Figure 11:
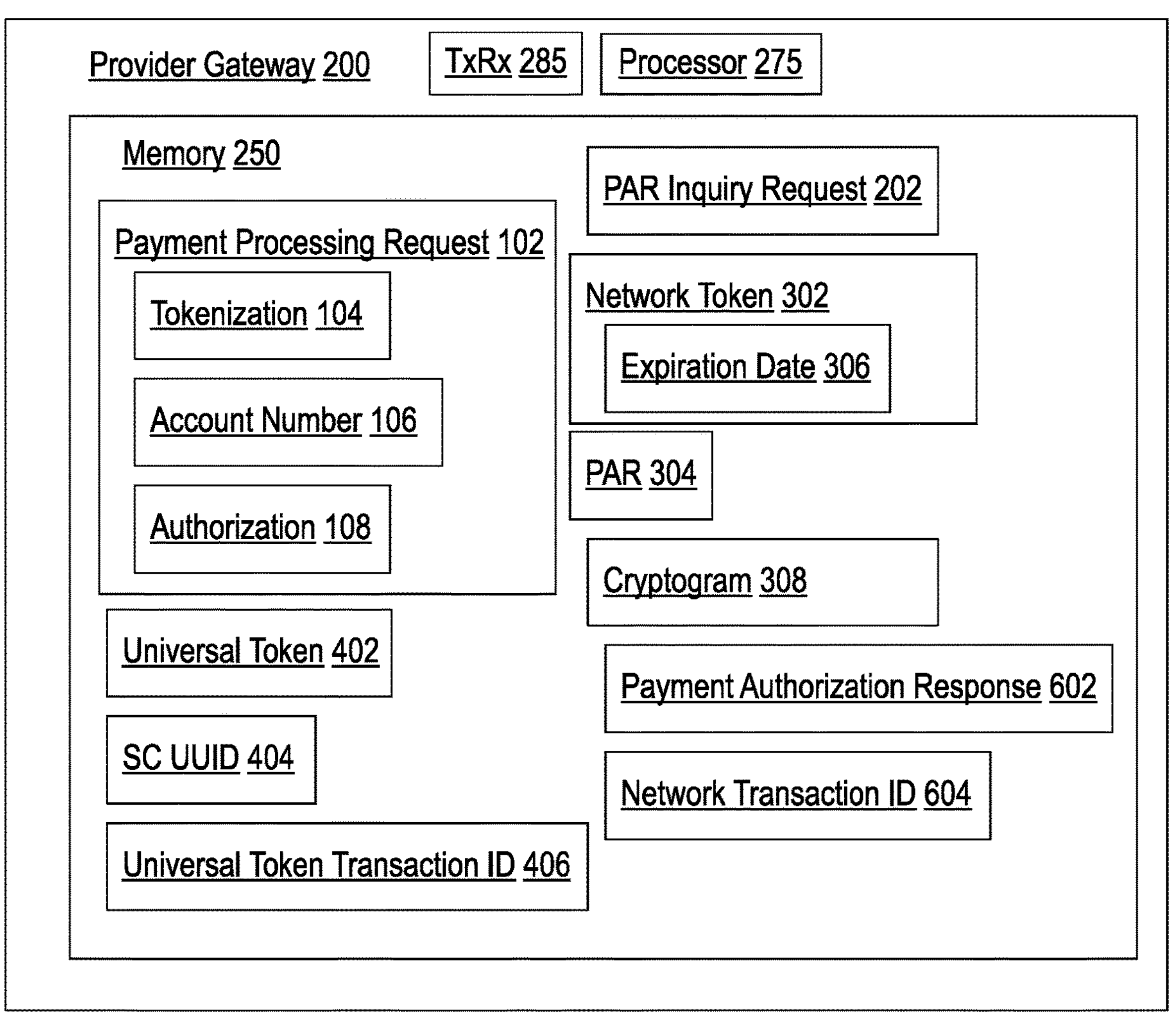
FIG. 11 is a schematic illustration of a provider gateway, in accordance with an example.

FIG. 11 is a schematic illustration of a provider gateway 200. The provider gateway 200 includes a memory 250, a processor 275, and a transceiver 285. As shown in the previous figures, the transceiver 285 may be used to enable the provider gateway 200 to wirelessly communicate with various aspects of a payment system, such as a payment terminal 100*b*, a payment network 300, a universal token vault 400, a merchant server 500, and/or an acquirer 600. The memory 250 stores a payment processing request 102 received from the payment terminal 100*b*. The payment processing request 102 may include a tokenization request 104, an account number 106, and a payment authorization request 108. The provider gateway 200 then sends a PAR inquiry request 202 and the account number 106 to the payment network 300 to receive and store a network token 302 (having an expiration date 306) and a PAR 304. The memory 250 may further store a universal token 402, SC UUID 404, and universal token transaction ID 406 received from the universal token vault 400. Additionally, the memory 250 stores a payment authorization response 602 and network transaction ID 604 received from the acquirer 600. In some examples, the memory 250 may also store a cryptogram 308 received from the payment network 300.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A system for authenticating a payment transaction, comprising:

a payment device configured to provide a payment processing request, wherein the payment processing request comprises a tokenization request and an account number associated with a customer making the payment processing request, wherein the account number is one of a primary account number (PAN) or one or more device primary account numbers (DPANs) associated with a payment account reference (PAR), wherein each of the one or more DPANs correspond to the PAN, and wherein the payment device is configured to capture the account number from a customer card or a customer device;

a provider gateway configured to:

receive the payment processing request from the payment device;

providing the account number and the tokenization request to a payment network; and receive, via the payment network, a network token based on the account number and the PAR corresponding to the account number;

a universal token vault configured to:

receive, via the provider gateway, the network token and the PAR; and update a universal token to associate the network token with the PAR in addition to one or more other network tokens, wherein each of the one or more other network tokens correspond to the PAN or the one or more DPANs previously associated with the PAR.

2. The system of claim 1, wherein the payment device is an electronic cash register (ECR) or a payment terminal.

3. The system of claim 1, wherein the payment network is a credit card service, debit card service, subscription service, e-commerce solution, or alternative payment method.

4. The system of claim 1, wherein the universal token vault is further configured to provide the universal token to a merchant server.

5. The system of claim 1, wherein the universal token vault is further configured to create a stored credential universally unique identifier (SC UUID).

6. The system of claim 5, wherein the universal token vault is further configured to provide the SC UUID to a merchant server.

7. The system of claim 1, wherein the universal token associates a plurality of network tokens with the PAR.

8. The system of claim 1, wherein the payment processing request further comprises a payment authorization request.

9. The system of claim 8, wherein the universal token is created or updated in response to the provider gateway receiving a payment authorization response from an acquirer.

10. The system of claim 9, wherein the acquirer is configured to generate the payment authorization response based on receiving the payment authorization request via the provider gateway.

11. The system of claim 1, wherein the network token comprises an expiration date.

12. The system of claim 1, wherein the payment device is configured to retrieve the account number from a customer card or a customer device.

13. A system of authorizing a payment transaction, comprising:

a payment device configured to capture an account number from a customer card or a customer device, wherein the account number is one of a primary account number (PAN) or one or more device primary account numbers (DPANs) associated with a payment account reference (PAR), and wherein each of the one or more DPANs correspond to the PAN;

a provider gateway configured to receive, via a merchant server, a universal token and a payment authorization request, wherein the universal token corresponds to a plurality of network tokens, wherein each of the plurality of network tokens corresponds to the PAN or the one or more DPANs previously associated with the PAR;

a universal token vault configured to:

receive, via the provider gateway, the universal token; and retrieve, a network token of the plurality of network tokens corresponding to the universal token, wherein the network token corresponds to the account number;

provide the network token to the provider gateway;

an acquirer in communication with a payment network, the acquirer configured to:

receive, via the provider gateway, the network token and the payment authorization request;

generate a payment authorization response based on the network token and the payment authorization request; and provide, via the provider gateway, the payment authorization response to the merchant server.

14. The system of claim 13, wherein the provider gateway is further configured to receive a cryptogram from the payment network.

15. The system of claim 14, wherein the provider gateway is further configured to provide the cryptogram to the acquirer, and further wherein generating the payment authorization response by the acquirer is further based on the cryptogram.

16. A provider gateway communicatively coupled to a payment device and a universal token vault, wherein the payment device is configured to capture the account number from a customer card or a customer device, wherein the account number is one of a primary account number (PAN) or one or more device primary account numbers (DPANs)

associated with a payment account reference (PAR), and wherein each of the one or more DPANs correspond to the PAN, the provider gateway configured to:

receive a payment processing request from the payment device, wherein the payment processing request comprises a tokenization request and an account number associated with a user making the payment processing request;

provide the account number and the tokenization request to a payment network;

receive, via the payment network, a network token based on the account number and the PAR corresponding to the account number;

provide the network token and the PAR to the universal token vault;

receive, via the universal token vault, a universal token, wherein the universal token associates the network token with the PAR in addition to one or more other network tokens previously associated with the PAR, wherein each of the one or more other network tokens correspond to the PAN or the one or more DPANs; and provide the universal token to a merchant server.

17. The provider gateway of claim 16, wherein the provider gateway is further configured to:

receive, via the merchant server, a universal token and a payment authorization request;

provide the universal token to the universal token vault;

receive, via the universal token vault, the network token corresponding to the universal token;

provide the network token and the payment authorization request to an acquirer communicatively coupled to the payment network;

receive, via the acquirer, a payment authorization response based on the network token and the payment authorization request; and provide the payment authorization response to the merchant server.

* * * * *